United States Patent
Subrahmanyam et al.

(10) Patent No.: US 7,099,117 B1
(45) Date of Patent: Aug. 29, 2006

(54) HEAD STACK ASSEMBLY INCLUDING A TRACE SUSPENSION ASSEMBLY BACKING LAYER AND A GROUND TRACE FOR GROUNDING A SLIDER

(75) Inventors: Jai N. Subrahmanyam, San Diego, CA (US); Gopalakrishna Kote, Fremont, CA (US); Kathy X. Tang, Fremont, CA (US); Loi D. Pham, Fremont, CA (US); Jack M. Chue, Los Altos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 85 days.

(21) Appl. No.: 10/676,537

(22) Filed: Sep. 30, 2003

(51) Int. Cl.
*G11B 5/596* (2006.01)
*G11B 5/60* (2006.01)

(52) U.S. Cl. .................. 360/245.9; 360/234.5
(58) Field of Classification Search ............. 360/234.5, 360/245.9
See application file for complete search history.

(56) References Cited

U.S. PATENT DOCUMENTS

| | | |
|---|---|---|
| 4,030,189 A | 6/1977 | Lazzari |
| 5,587,857 A | 12/1996 | Voldman et al. |
| 5,645,735 A * | 7/1997 | Bennin et al. ............... 216/22 |
| 5,930,072 A | 7/1999 | Shrinkle |
| 5,995,328 A | 11/1999 | Balakrishnan |
| 6,160,688 A | 12/2000 | Okamura |
| 6,493,190 B1 | 12/2002 | Coon |
| 6,621,661 B1 | 9/2003 | Ichikawa et al. |
| 6,826,016 B1 | 11/2004 | Katsumata |
| 2003/0128474 A1 | 7/2003 | Schultz et al. ........... 360/245.9 |
| 2004/0022169 A1 | 2/2004 | Ichikawa et al. |
| 2004/0070880 A1 | 4/2004 | Fu et al. ................. 360/234.5 |

* cited by examiner

Primary Examiner—Robert S. Tupper
(74) Attorney, Agent, or Firm—Stetina, Brunda, Garred & Brucker (57) ABSTRACT

A head stack assembly includes a flex cable assembly. The head stack assembly further includes an actuator arm and a load beam coupled to the actuator arm. The head stack assembly further includes a trace suspension assembly backing layer coupled to the load beam and including a gimbal. The head stack assembly further includes a dielectric layer disposed upon the trace suspension assembly backing layer. The head stack assembly further includes a slider supported by the gimbal. The head stack assembly further includes a ground trace disposed upon the dielectric layer with the dielectric layer between the ground trace and the trace suspension assembly backing layer. The ground trace extends along the actuator arm and is electrically connected to the slider and the flex cable assembly for grounding the slider to the flex cable assembly.

7 Claims, 8 Drawing Sheets

HEAD STACK ASSEMBLY INCLUDING A TRACE SUSPENSION ASSEMBLY BACKING LAYER AND A GROUND TRACE FOR GROUNDING A SLIDER

BACKGROUND OF THE INVENTION

1. Field of the Invention

The present invention relates generally to disk drives, and in particular to a disk drive including head stack assembly including a trace suspension assembly backing layer and a ground trace for grounding a slider.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body.

A head gimbal assembly includes a transducer head, typically a magneto-resistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

The head gimbal assembly includes a slider. The transducer head is disposed within the slider. A head gimbal assembly without an attached slider is referred to as a suspension assembly. In this regard the suspension assembly acts to suspend or support the slider. The head gimbal assembly may further include a trace suspension assembly, a load beam (also referred to as a "suspension"), nut plate (also referred to as a "swage plate"), and a hinge plate.

The trace suspension assembly typically includes a trace suspension assembly backing layer typically formed of a conductive material such as stainless steel. Conductive traces (formed of copper for example) are laid on a dielectric layer (such as a polyimide) formed on the trace suspension assembly backing layer. The dielectric layer electrically insulates the conductive traces from the trace suspension assembly backing layer. Such technologies are variously named TSA (Trace Suspension Assembly), NSL (No Service Loop), FOS (Flex On Suspension) and the like. These conductive traces interconnect the elements of the transducer head to the drive preamp and the circuits associated therewith. There are typically four conductive traces for the write and read differential pairs of the transducer head. The conductive traces are electrically connected to the transducer head at a trailing end of the slider. Such conductive traces are typically formed upon the dielectric layer through a deposition and/or etching process. The conductive traces include terminal pads which are disposed adjacent the slider. Various electrical connection techniques may be used to connect the terminal pads to the slider, such as gold ball bonding or wire bonding.

Trace suspension assembly backing layer includes a gimbal which overlaps with the load beam. The load beam is configured to transmit a gram load biasing force to the gimbal to "load" the slider against the disk. The hinge plate joins the load beam to the nut plate to permit the slider to follow the surface contour of the spinning disk. The spinning disk develops a laminar airflow above its surface that lifts the slider away from the disk in opposition to the gram load biasing force. The slider is said to be "flying" over the disk when in this state. The nut plate is used to attach the head gimbal assembly to a tip of the actuator arm via a swaging operation.

As disk drives have progressed to higher areal densities, the fly height has been correspondingly reduced. The reduction in fly height has made head (slider)-to-disk interactions more likely. In particular, such close proximity of the slider to the disk may result in undesirable electrical discharge between the slider and the disk. In this regard, while the slider may be attached to the gimbal using structural epoxy, a conductive material such as conductive epoxy (such as silver epoxy) may be applied for electrical and thermal conductivity. The conductive epoxy provides a conductive path to electrical ground from the slider to the gimbal which in turn is electrically connected to the load beam, the actuator arm, and eventually the disk drive base. The application of voltage between the slider and the gimbal in excess of the "breakdown voltage" may be used in order to establish an impedance path through the conductive epoxy. In practice, however, such an impedance path may not be all that well controlled and, as such, undesirable electrical discharge events between the slider and the disk may nonetheless occur. In addition, use of conductive epoxies has other problems. The thermal expansion tensor of silver conductive epoxy, for example, has significant variation with temperature due to the present of silver particles. Further, the silver conductive epoxy may cause fly height variation of the slider due to crown effects.

Accordingly, there is a need in the art for a disk drive having an improved head stack assembly design in comparison to the prior art.

SUMMARY OF THE INVENTION

According to an aspect of the present invention, there is provided a head stack assembly for use with a disk drive. The head stack assembly includes a flex cable assembly. The head stack assembly further includes an actuator including an actuator arm. The head stack assembly further includes a load beam coupled to the actuator arm. The load beam is formed of an electrically conductive material. The head stack assembly further includes a trace suspension assembly backing layer formed of an electrically conductive material. The trace suspension assembly backing layer is coupled to the load beam and includes a gimbal. The head stack assembly further includes a dielectric layer disposed upon the trace suspension assembly backing layer. The head stack assembly further includes a slider supported by the gimbal. The head stack assembly further includes a ground trace disposed upon the dielectric layer with the dielectric layer between the ground trace and the trace suspension assembly backing layer. The ground trace extends along the actuator arm and is electrically connected to the slider and the flex cable assembly for grounding the slider to the flex cable assembly.

According to various embodiments, the actuator further includes an actuator body and the actuator arm includes a base portion attached to the actuator body. The flex cable assembly is attached to the actuator body and extends to adjacent the base portion. The ground trace may extend to adjacent the base portion and the ground trace is electrically connected to the flex cable assembly adjacent to the base portion. The head stack assembly may further includes read and write traces disposed upon the dielectric layer with the dielectric layer between the read and write traces and the trace suspension assembly backing layer. The read and write traces may be disposed in electrical communication with the slider and the flex cable assembly. The flex cable assembly may include a pre-amp ground and the ground trace may be disposed in electrical communication with the pre-amp ground. According to another aspect of the present invention, there is provided a disk drive. The disk drive includes a disk drive base and a head stack assembly rotatably coupled to the disk drive base. The head stack assembly is as described above.

According to another aspect of the present invention, there is provided a head gimbal assembly for use with an actuator arm of a disk drive. The head gimbal assembly includes a load beam formed of an electrically conductive material including a gimbal end and a swage end. The head gimbal assembly further includes a slider. The head gimbal assembly further includes a trace suspension assembly backing layer formed of an electrically conductive material. The trace suspension assembly backing layer is coupled to the load beam and including a gimbal disposed adjacent to the gimbal end. The gimbal is attached to the slider for supporting the slider. The head gimbal assembly further includes a dielectric layer disposed upon the trace suspension assembly backing layer. The head gimbal assembly further includes a ground trace disposed upon the dielectric layer with the dielectric layer between the ground trace and the trace suspension assembly backing layer. The ground trace extends between the gimbal end and the swage end. The ground trace is electrically connected to the slider for grounding the slider to the actuator arm.

According to various embodiments, the head gimbal assembly may further include a via disposed through the dielectric layer and the ground trace is electrically connected to the trace suspension assembly backing layer through the via. The head gimbal assembly may further include a swage plate having a swage opening and the load beam is attached to the swage plate. The ground trace is electrically connected to the trace suspension assembly backing layer at the swage plate adjacent the swage opening. The head gimbal assembly may further include a hinge plate and the load beam is attached to the swage plate though the hinge plate. The head gimbal assembly may further include read and write traces disposed upon the dielectric layer with the dielectric layer between the read and write traces and the trace suspension assembly backing layer. According to yet another aspect of the present invention, there is provided a disk drive. The disk drive includes a disk drive base and a head stack assembly rotatably coupled to the disk drive base. The head stack assembly is as described above.

According to yet another aspect of the present invention, there is provided a head gimbal assembly for a disk drive. The head gimbal assembly includes a trace suspension assembly backing layer formed of an electrically conductive material. The trace suspension assembly backing layer includes a load beam section, a gimbal coupled to the load beam section, and a ground trace disposed adjacent the gimbal and extending along the load beam section. The head gimbal assembly includes a dielectric layer disposed upon the trace suspension assembly backing layer adjacent to the gimbal. The head gimbal assembly includes a slider supported by the gimbal. The slider is electrically connected to the ground trace for electrically grounding the slider.

According to various embodiments, the head gimbal assembly may further include a load beam and the trace suspension assembly backing layer may be supported by the load beam. The trace suspension assembly backing layer may be attached to the load beam with a non-conductive epoxy disposed between the trace suspension assembly backing layer and the load beam. The head gimbal assembly may further include a via disposed through the dielectric layer, and the slider may be electrically connected to the trace suspension backing layer through the via. The head gimbal assembly may further include read and write traces disposed upon the dielectric layer with the dielectric layer between the read and write traces and the trace suspension assembly backing layer. The read and write traces are disposed in electrical communication with the slider. According to another aspect of the present invention, there is provided a disk drive. The disk drive includes a disk drive base and a rotary actuator rotatably coupled to the disk drive base. The rotary actuator includes a head gimbal assembly as described above.

DESCRIPTION OF THE PREFERRED EMBODIMENTS

Referring now to the drawings wherein the showings are for purposes of illustrating preferred embodiments of the present invention only, and not for purposes of limiting the same, FIGS. 1–17 illustrate a disk drive including a head gimbal assembly in accordance with aspects of the present invention.

Figure 1:
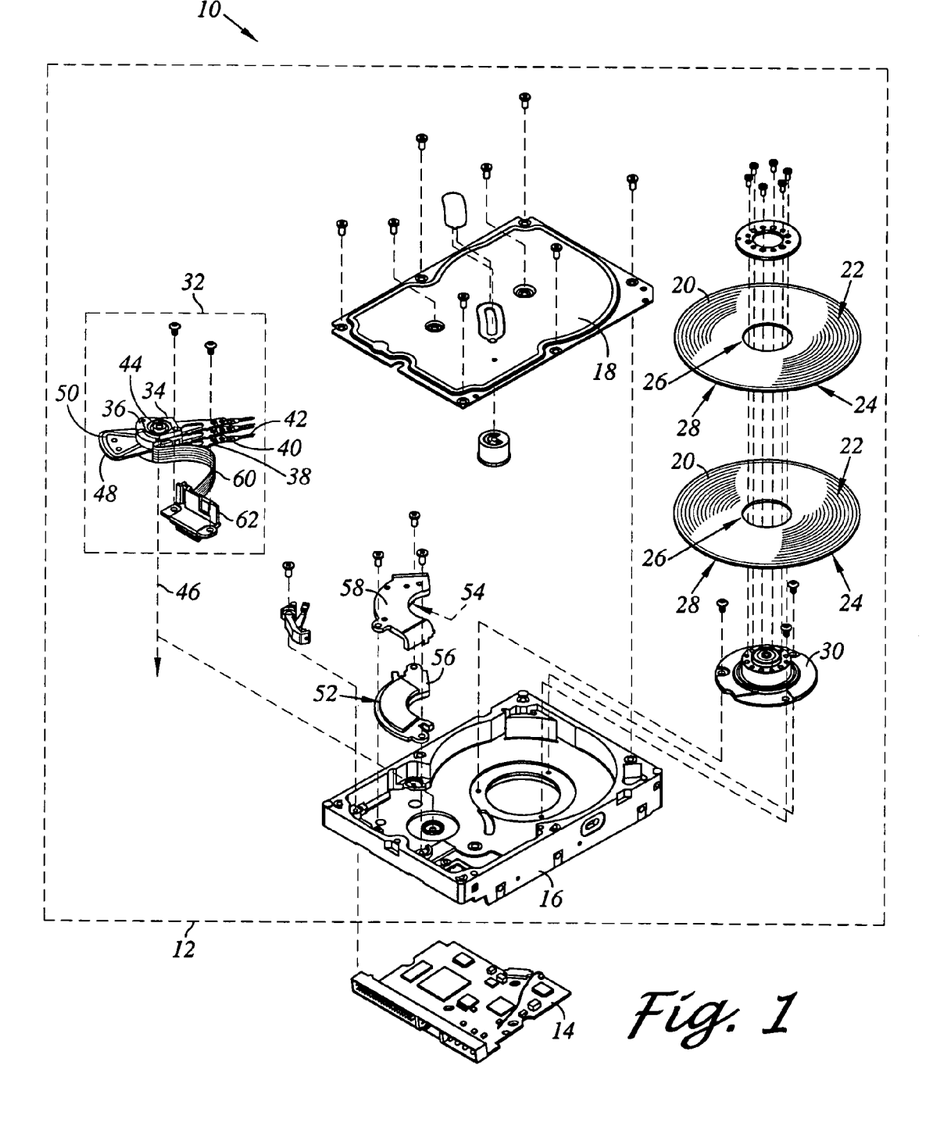
FIG. 1 is an exploded perspective view of a disk drive in accordance with an aspect of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house at least one magnetic disk 20. While two disks 20 are shown, a single disk of multiple disks may be provided. Each disk 20 contains a plurality of tracks for storing data. The tracks are disposed upon opposing first and second disk surfaces 22, 24 of the disk 20 that extend between an inner disk edge 26 (associated with the inner diameter) and an outer disk edge 28 (associated with the outer diameter) of the disk 20. The head disk assembly 12 further includes a spindle motor 30 for rotating the disk 20. The head disk assembly 12 further includes a head stack assembly 32 rotatably attached to the disk drive base 16 in operable communication with the disks 20. The head stack assembly 32 includes a rotary actuator 34.

The actuator 34 includes an actuator body 36 and actuator arms (for ease of illustration, only a topmost one being denoted 38) that extend from the actuator body 36. Distally attached to the actuator arms (the lowermost one being denoted 38) are head gimbal assemblies (the lowermost one denoted 40). The head gimbal assemblies 40 each includes a slider (the lowermost one denoted 42). Each of the sliders 42 includes a transducer head. The head gimbal assemblies 40 with the sliders 42 not attached are referred to as suspension assemblies. It is contemplated that the number of actuator arms and suspension assemblies may vary depending upon the number of disks and disk surfaces utilized.

The actuator body 36 includes a bore, and the actuator 34 further includes a pivot bearing cartridge 44 engaged within the bore for facilitating the actuator body 36 to rotate between limited positions about an axis of rotation 46. The actuator 34 further includes a coil support 48 that extends from one side of the actuator body 36 opposite the actuator arms 38. The coil support 48 is configured to support a coil 50. A pair of magnetic elements 52, 54 is supported by mounts 56, 58 which are attached to the disk drive base 16 (magnetic element 54 is indicated by the dashed lead line and it is understood the magnetic element 54 is disposed underneath the mount 58). The coil 50 interacts with the magnetic elements 52, 54 to form a voice coil motor for controllably rotating the actuator 34. The head stack assembly 32 further includes a flex circuit assembly 60 and a cable connector 62. The cable connector 62 is attached to the disk drive base 16 and is disposed in electrical communication with the printed circuit board 14. The flex circuit 60 supplies current to the actuator coil 52 and carries signals between the transducer heads 42 and the printed circuit board assembly 14.

Figures 2, 3:
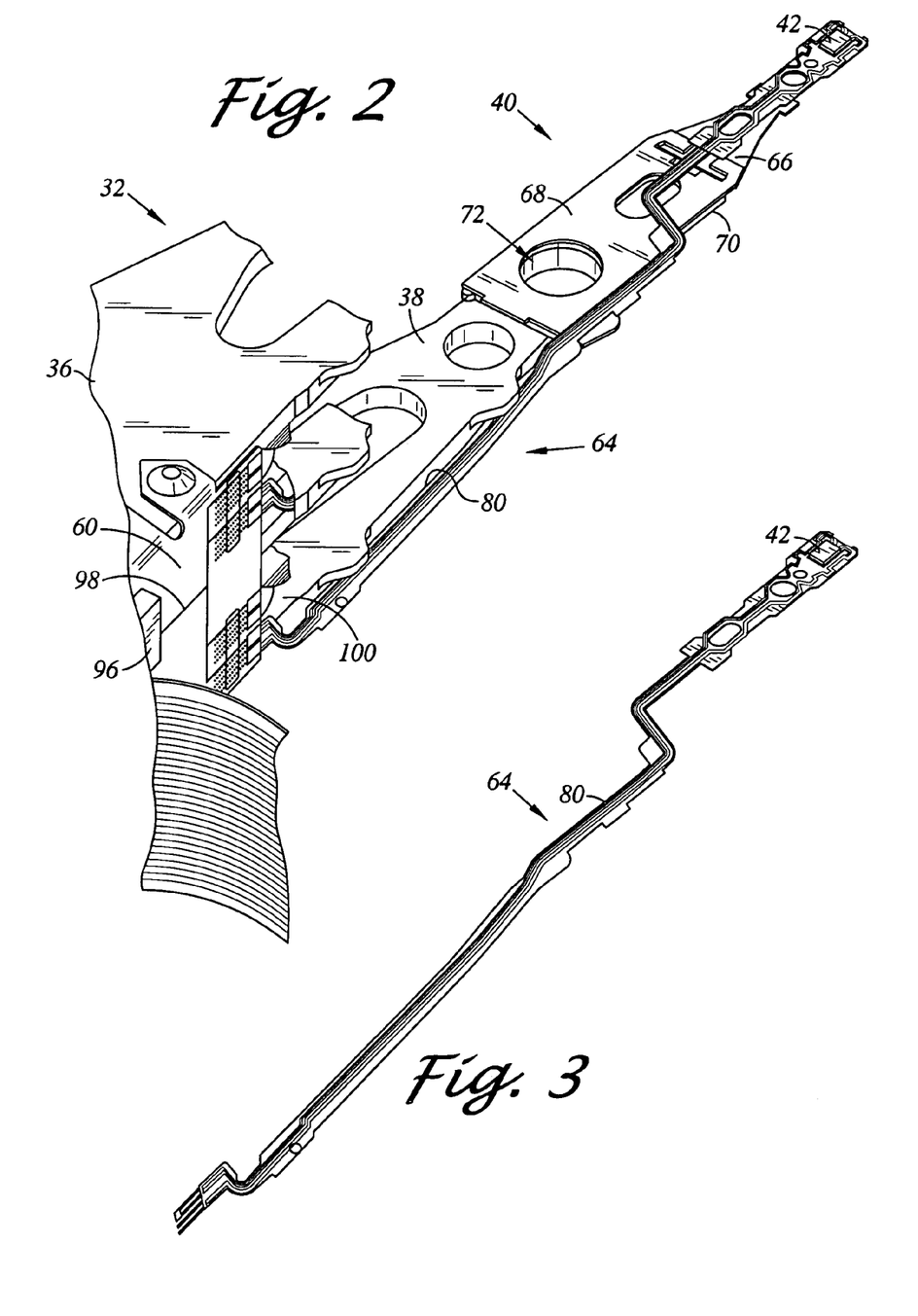
FIG. 2 is an enlarged perspective view of a portion of a head stack assembly of the disk drive of FIG. 1 including a head gimbal assembly according to an aspect of the present invention.
FIG. 3 is a perspective view of a trace suspension assembly of the head gimbal assembly of FIG. 2 as shown with a slider.
Figure 4:
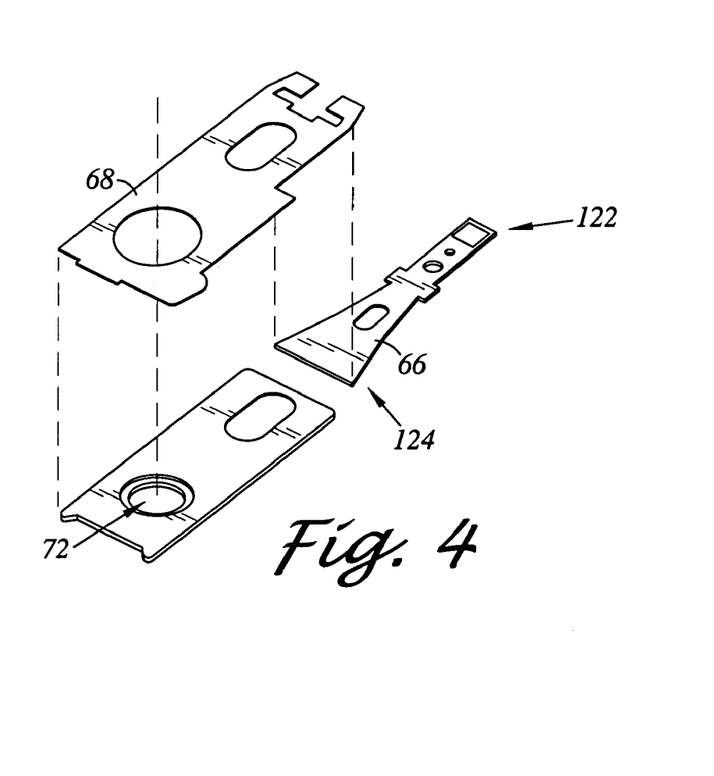
FIG. 4 is an enlarged exploded view of a load beam, a hinge plate, and a swage plate of the head gimbal assembly of FIG. 2.
Figure 5:
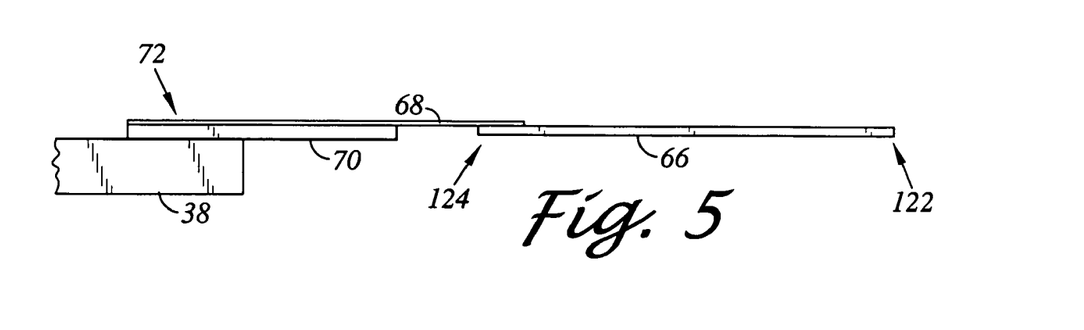
FIG. 5 is a side view of the load beam, the hinge plate, and the swage plate of FIG. 4 as assembled in relation to a portion of an actuator arm of the head stack assembly of FIG. 2.

FIG. 2 is an enlarged perspective view of a portion of a head stack assembly 32 of the disk drive 10 of FIG. 1 including the head gimbal assembly 40. Only portions of the two uppermost actuator arms 38 as shown so as to reveal the lowermost actuator arm 38. FIG. 3 is a perspective view of a trace suspension assembly 64 of the head gimbal assembly 40 of FIG. 2 as shown with the slider 42. FIG. 4 is an enlarged exploded view of a load beam 66, a hinge plate 68, and a swage plate 70 of the head gimbal assembly of FIG. 2. FIG. 5 is a side view of the load beam 66, the hinge plate 68, and the swage plate 70 of FIG. 4 as assembled in relation to a portion of an actuator arm 38. The hinge plate 68 may be used to couple the load beam 66 to the swage plate 70. The swage plate 70 may include a swage opening 72 that is utilized to attach the swage plate 70 and hinge plate 68 to the actuator arm 38 via a swaging operation. Thus, the load beam 66 may be coupled to the actuator arm 38.

Figure 6:
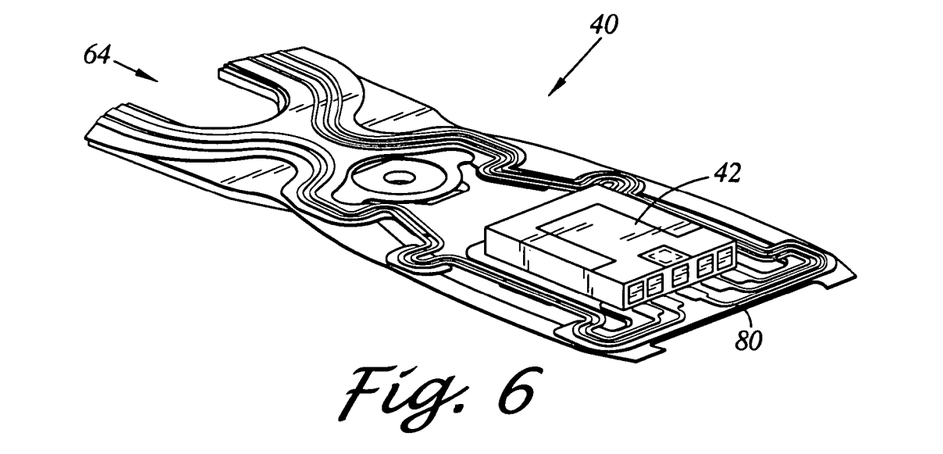
FIG. 6 is an enlarged perspective view of a portion of the trace suspension assembly and a slider (shown in phantom lines) of FIG. 3 as seen from another viewing angle.
Figure 7:
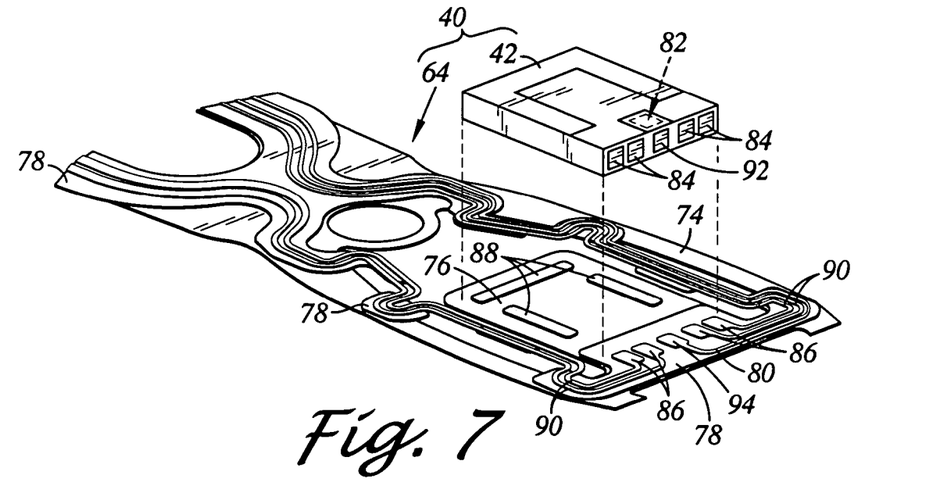
FIG. 7 is an enlarged view of the portion of the trace suspension assembly of FIG. 6 with the slider seen exploded from the trace suspension assembly.

FIG. 6 is an enlarged perspective view of a portion of the trace suspension assembly 64 and slider 42 (shown in phantom lines) of FIG. 3 as seen from another viewing angle. FIG. 7 is an enlarged view of the portion of the trace suspension assembly 64 of FIG. 6 with the slider 42 seen exploded from the trace suspension assembly 64. The trace suspension assembly 64 includes a trace suspension assembly backing layer 74 which includes a gimbal 76. The gimbal 76 is configured to support the slider 42.

According to an aspect of the present invention, there is provided the head stack assembly 32 for use with the disk drive 10. The head stack assembly 32 includes the flex cable assembly 60. The head stack assembly 32 further includes the actuator 34 including the actuator arm 38. The head stack assembly 32 further includes the load beam 66 coupled to the actuator arm 38. The load beam 66 is formed of an electrically conductive material. The head stack assembly 32 further includes the trace suspension assembly backing layer 74 formed of an electrically conductive material. The trace suspension assembly backing layer 74 is coupled to the load beam 66 and includes the gimbal 76. The head stack assembly 32 further includes a dielectric layer 78 disposed upon the trace suspension assembly backing layer 74. The head stack assembly 32 further includes the slider 42 supported by the gimbal 76. The head stack assembly 32 further includes a ground trace 80 disposed upon the dielectric layer 78 with the dielectric layer 78 between the ground trace 80 and the trace suspension assembly backing layer 74. As shown in FIG. 2, the ground trace 80 extends along the actuator arm 38. The ground trace 80 is electrically connected to the slider 42 and the flex cable assembly 60 for grounding the slider 42 to the flex cable assembly 60. It is contemplated that the flex cable assembly 60 may include an electrical ground for connection to the ground trace 80, and thus, may provide a controlled impedance path for grounding the slider 42. This is in contrast to a direct electrical short to ground such as a direct connection between the gimbal 76 and the slider 42.

In further detail according to various embodiments, referring to FIG. 7, the slider 42 includes a transducer head 82 disposed within the slider 42 (as indicated in dashed line). The slider 42 may be supported by dielectric layer pads 88 of the dielectric layer 78. Though not shown, in those regions about the dielectric layer pads 88, a non-conductive structural epoxy may be used for secure attachment of the slider 42 to the gimbal 76 while electrically insulating the slider 42 and the gimbal 76.

The slider 42 may include slider conductive pads 84 which internally connect to electrical components of the transducer head 82. Trace conductive pads 86 may be formed upon the dielectric layer 78. The head stack assembly 32 may further include read and write traces 90 disposed upon the dielectric layer 78 along with the ground trace 80. The trace conductive pads 86 extend to the read and write traces 90. The slider conductive pads 84 may be electrically connected to the trace conductive pads 86 using any suitable electronic connection technique such as gold ball bonding. The slider 42 may include a slider ground pad 92 for grounding the slider 42. A trace ground pad 94 may be disposed upon the dielectric layer 78. The trace ground pad 94 may extend to the ground trace 80. The slider ground pad 92 may be electrically connected to the trace ground pad 94 using any suitable electronic connection technique such as gold ball bonding.

The ground trace 80, trace ground pad 94, the read and write traces 90, and the trace conductive pads 86 may be of any suitable conductive material such as a metal like copper for example. The material may be deposited and/or etched upon the dielectric layer 78. The dielectric layer 78 may be formed of a non-conductive material such as polyimide. The dielectric layer 78 is disposed between the trace suspension assembly backing layer 74 and the ground trace 80, the trace ground pad 94, the read and write traces 90, and the trace conductive pads 86. As such, the dielectric layer 78 is used to electrically insulate the ground trace 80, the trace ground pad 94, the read and write traces 90, and the trace conductive pads 86 from the trace suspension assembly backing layer 74 which may be formed of stainless steel for example.

The read and write traces 90 may be disposed in electrical communication with the slider 42 and the flex cable assembly 60. The flex cable assembly 60 may include a pre-amp 96. The pre-amp 96 may be utilized to amplify electronic signals from the transducer head 82 and pass such amplified electronic signals to the printed circuit board assembly 14. Further, the flex cable assembly 60 may include a pre-amp ground 98 and the ground trace 80 may be disposed in electrical communication with the pre-amp ground 98. Such pre-amp ground 98 may be electrically connected to the printed circuit board assembly 14 or some other source of electrical ground, such as the actuator body 36.

As mentioned above, the trace suspension assembly backing layer 74 is coupled to the load beam 66. The load beam 74 is generally configured to support the trace suspension backing layer 74 adjacent the gimbal 76. In this regard, the trace suspension assembly backing layer 74 may be laid upon the load beam 66. In addition, the trace suspension assembly backing layer 74 may be laid upon the hinge plate 68 and further supported by the actuator arm 38. The trace suspension assembly backing layer 74 may be further attached with an adhesive such as a non-conductive epoxy.

The actuator 34 further includes the actuator body 36, and the actuator arm 38 includes a base portion 100 attached to the actuator body 36 as seen in FIG. 2. The flex cable assembly 60 is attached to the actuator body 36 and extends to adjacent the base portion 100. The ground trace 80 may extend to adjacent the base portion 100, and the ground trace 80 is electrically connected to the flex cable assembly 60 adjacent to the base portion 100.

According to another aspect of the present invention, there is provided the disk drive 10. The disk drive 10 includes the disk drive base 16 and the head stack assembly 32 rotatably coupled to the disk drive base 16. The head stack assembly 32 is as described above.

Figures 8, 9:
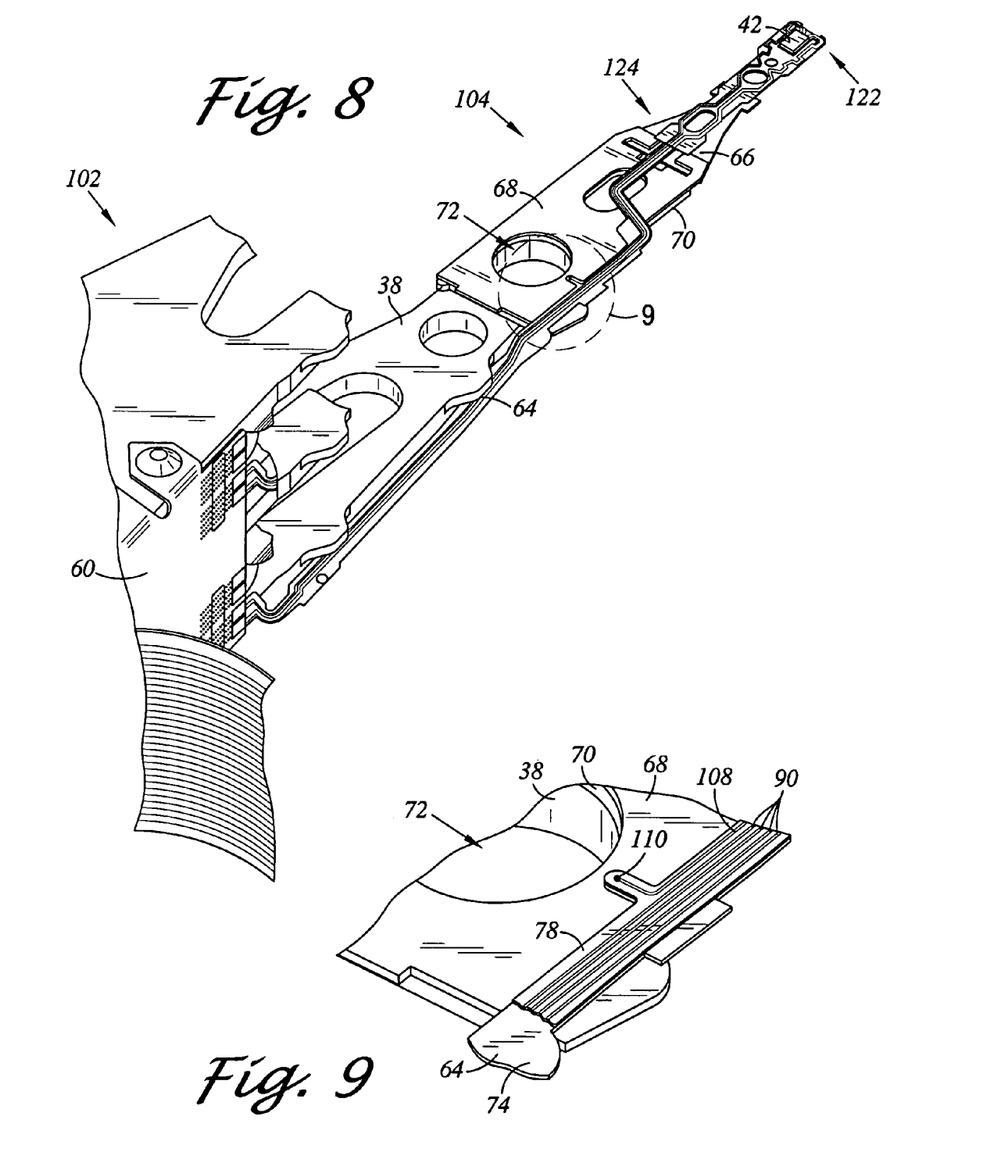
FIG. 8 is an enlarged perspective view of a portion of a head stack assembly similar to the view of FIG. 2, however, according to another aspect of the present invention.
FIG. 9 is an enlarged view of a portion of the head stack assembly of FIG. 8 with a ground trace shown extending to adjacent a swage opening.

Referring now to FIGS. 8 and 9, there is depicted another embodiment of the present invention. FIG. 8 is an enlarged perspective view of a head stack assembly 102 similar to the view of FIG. 2, however, with the differences noted. As such, unless noted the head stack assembly 102 is similar in configuration to the head stack assembly 32 for use in the disk drive 10. FIG. 9 is an enlarged view of a portion of the head stack assembly 102 of FIG. 8. The head stack assembly 102 includes a head gimbal assembly 104 is similar in configuration to the head gimbal assembly 40 with differences noted.

According to another aspect of the present invention, there is provided the head gimbal assembly 104 for the disk drive 10. The head gimbal assembly 104 includes the load beam 66 formed of an electrically conductive material. The load beam 66 includes a gimbal end 122 and a swage end 124 (as shown in FIGS. 4, 5, and 8). The head gimbal assembly further includes the slider 42. The head gimbal assembly 104 further includes the trace suspension assembly backing layer 74 formed of an electrically conductive material. The trace suspension assembly backing layer 74 is coupled to the load beam 66 and includes the gimbal 76 disposed adjacent to the gimbal end 122. The gimbal 76 is attached to the slider 42 for supporting the slider 42. The head gimbal assembly 104 further includes the dielectric layer 78 disposed upon the trace suspension assembly backing layer 74. The head gimbal assembly 104 further includes a ground trace 108 disposed upon the dielectric layer 78 with the dielectric layer 78 between the ground trace 108 and the trace suspension assembly backing layer 74. The ground trace 108 extends between the gimbal end 122 and the swage end 124. The ground trace 108 is electrically connected to the slider 42 for grounding the slider 42 to the actuator arm 38.

As mentioned above, the load beam 66 includes a gimbal end 122 and a swage end 124. As used herein the gimbal end 122 refers to that end of the load beam 66 that is closest to the gimbal 76 and the slider 42. The swage end 124 refers to that end of the load beam 66 that is opposite the gimbal end 122 and may also refer to that end that is closest to the attachment location with the actuator arm 38.

According to various embodiments, the head gimbal assembly 104 may further include the load beam 66, and the trace suspension assembly backing layer 74 may be supported by the load beam 66. The ground trace 108 is contemplated to be electrically connected to the slider 42 such as utilizing the slider ground pad 92 and trace ground pad 94 as shown in FIG. 7. While the ground trace 108 may be configured similar to the ground trace 80, in the embodiment shown however, the ground trace 108 does not extend along the entire length of the actuator arm 38 for electrical attachment to the flex cable assembly 60. Rather, the ground trace 108 may be disposed in electrical communication with the trace suspension assembly backing layer 74.

Referring to the enlarged view of a portion of the head stack assembly 102 of FIG. 8, the ground trace 108 may terminate at a via 110. The via 110 may be disposed through the dielectric layer 78, and the slider 42 may be electrically connected to the trace suspension assembly backing layer 74 through the via 110. The trace suspension assembly backing layer 74 adjacent to the via 110 may be attached to an electrical ground. For example, the trace suspension assembly backing layer 74 may be in electrical communication with other components of the head gimbal assembly 104, such as the load beam 66 or the hinge plate 68. The load beam 66 and the hinge plate 68 are joined with the swage plate 70 which is attached the actuator arm 38. It is contemplated that the actuator arm 38 is in electrical communication with the disk drive base 10 via the pivot bearing cartridge 44 and thus, is considered to be an electrical ground. In the embodiment shown, the trace suspension assembly backing layer 74 is disposed in electrical communication with hinge plate 68 adjacent that portion of the hinge plate 68 near the swage opening 72 of the swage plate 70.

The head gimbal assembly 104 may further include the read and write traces 90 disposed upon the dielectric layer 78 with the dielectric layer 78 between the read and write traces 90 and the trace suspension assembly backing layer 74. The read and write traces 90 are disposed in electrical communication with the slider 42.

According to another aspect of the present invention, there is provided the disk drive 10. The disk drive 10 includes the disk drive base 16 and the rotary actuator 34 rotatably coupled to the disk drive base 16. The rotary actuator 16 includes the head gimbal assembly 104 as described above.

Figures 10, 11:
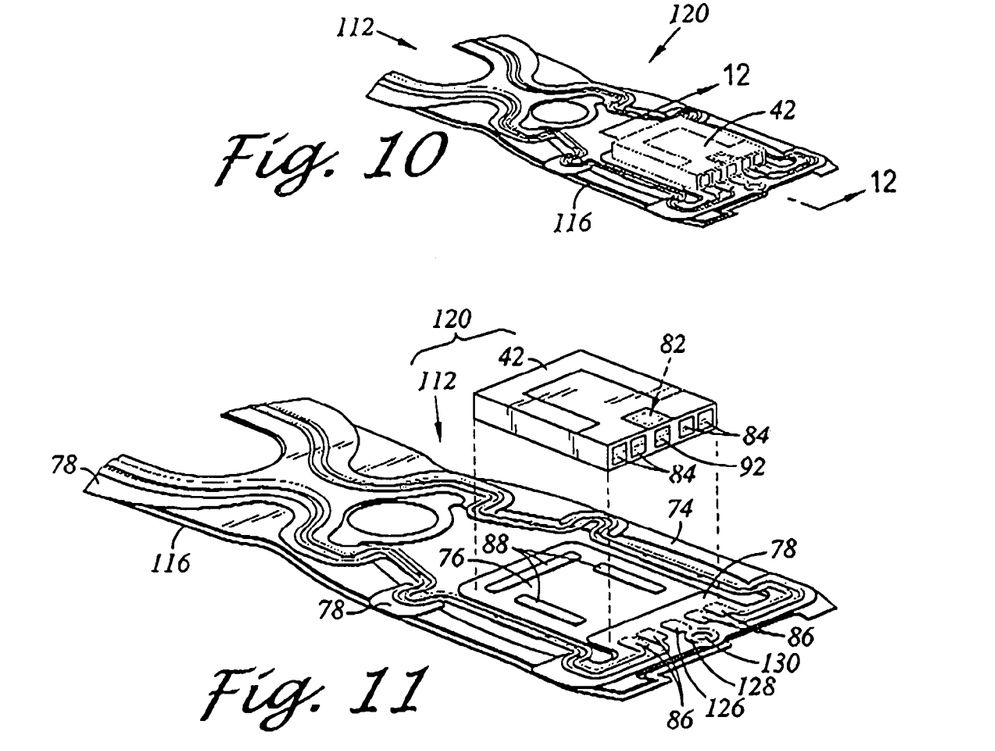
FIG. 10 is an enlarged perspective view of a portion of a trace suspension assembly and a slider (shown in phantom lines) similar to the view of FIG. 6, however, according to another aspect of the present invention.
FIG. 11 is an enlarged view of the portion of the trace suspension assembly of FIG. 10 with the slider seen exploded from the trace suspension assembly.

Referring now to FIGS. 10–17, there is depicted another embodiment of the present invention. FIG. 10 is an enlarged perspective view of a portion of a trace suspension assembly 112 and the slider 42 (shown in phantom lines) similar to the view of FIG. 6, however, according to another aspect of the present invention.

Figure 12:
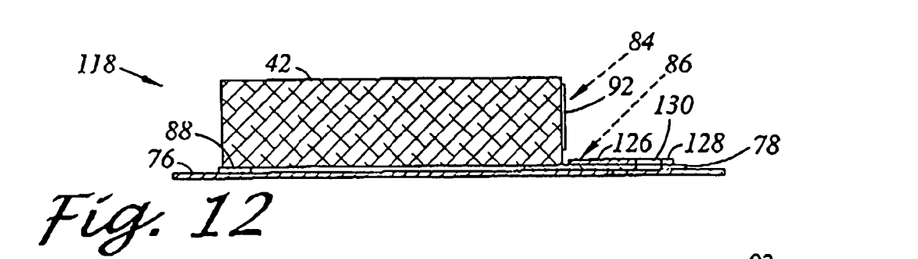
FIG. 12 is an enlarged cross-sectional side view of a portion of the trace suspension assembly and the slider as seen along axis 12—12 of FIG. 10.
Figure 13:
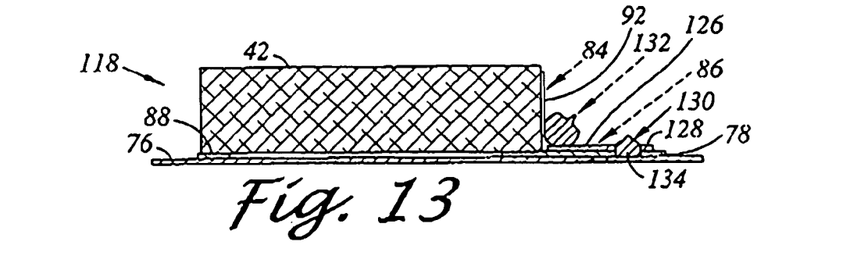
FIG. 13 is the enlarged cross-sectional side view of FIG. 12, however, as shown with electrical connections.
Figure 14:
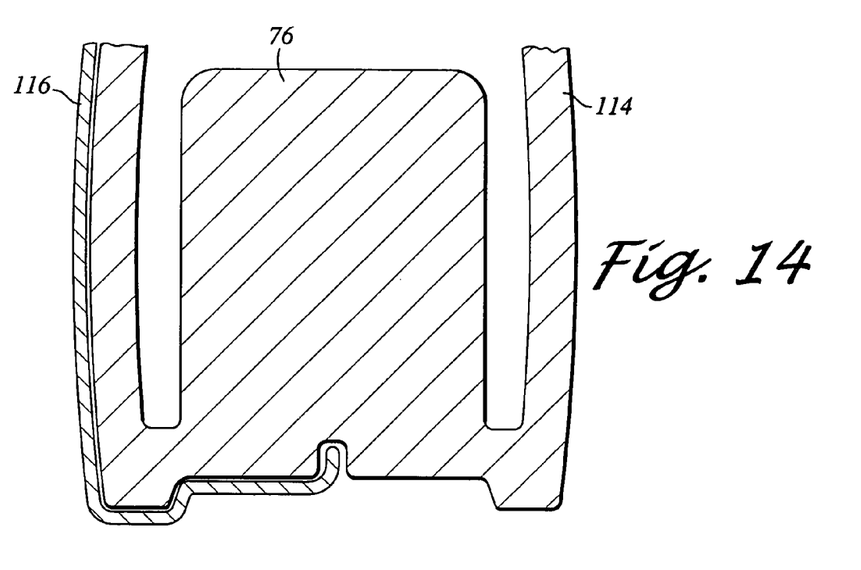
FIG. 14 is an enlarged plan view of a portion of a trace suspension assembly backing layer of the trace suspension assembly of FIG. 12 including a ground trace.
Figure 15:
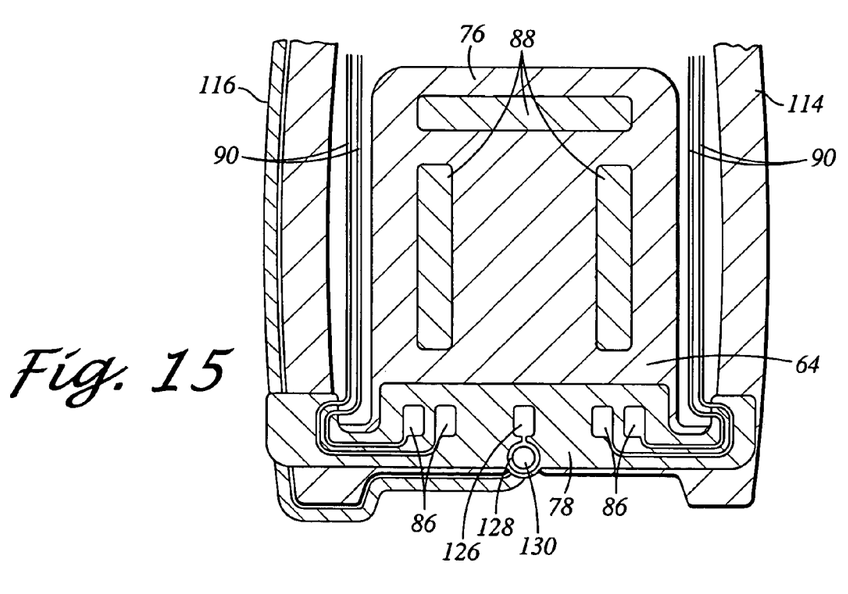
FIG. 15 is an enlarged plan view of a portion of the trace suspension assembly backing layer of FIG. 14 as shown with traces disposed upon a dielectric layer.
Figures 16, 17:
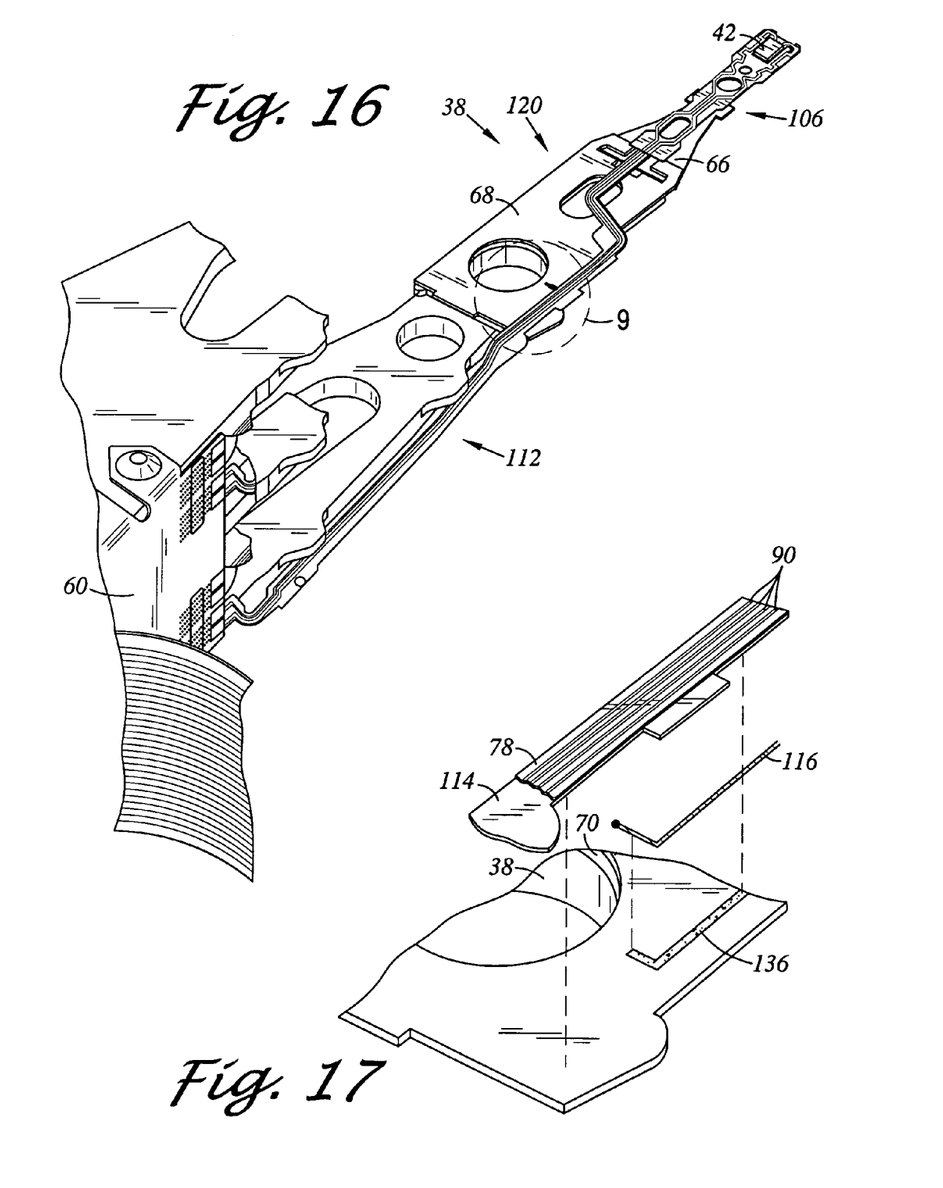
FIG. 16 is an enlarged perspective view of a portion of a head stack assembly including the trace suspension assembly and the slider of FIG. 10.
FIG. 17 is an enlarged view of a portion of the head stack assembly of FIG. 16.

FIG. 11 is an enlarged view of the portion of the trace suspension assembly 112 of FIG. 10 with the slider 42 seen exploded from the trace suspension assembly 112. FIG. 12 is an enlarged cross-sectional side view of a portion of the trace suspension assembly 112 and the slider 42 as seen along axis 12—12 of FIG. 10. FIG. 13 is the enlarged cross-sectional side view of FIG. 12, however, as shown with electrical connections. FIG. 14 is an enlarged plan view of a portion of a trace suspension assembly backing layer 114 of the trace suspension assembly 112 of FIG. 12 including a ground trace 116. FIG. 15 is an enlarged plan view of a portion of the trace suspension assembly backing layer 114 of FIG. 14 as shown with the read and write traces 90 disposed upon the dielectric layer 78. FIG. 16 is an enlarged perspective view of a portion of a head stack assembly 118 including the trace suspension assembly 112 and the slider 42 of FIG. 10. FIG. 17 is an enlarged view of a portion of the head stack assembly 118 of FIG. 16. The head stack assembly 118 includes a head gimbal assembly 120. The head stack assembly 118 and the head gimbal assembly 120 are generally similar to the head stack assembly 32 and the head gimbal assembly 40, however, with the differences noted.

According to yet another aspect of the present invention, there is provided the head gimbal assembly 120 for the disk drive 10. The head gimbal assembly 120 includes the trace suspension assembly backing layer 114 formed of an electrically conductive material. The trace suspension assembly backing layer 114 includes a load beam section 106, as indicated in FIG. 16. The trace suspension assembly backing layer 114 further includes the gimbal 76 coupled to the load beam section 106. The trace suspension assembly backing layer 114 further includes a ground trace 116 disposed adjacent the gimbal 76. The ground trace 116 extends along the load beam section 106. The head gimbal assembly 120 further includes the dielectric layer 78 disposed upon the trace suspension assembly backing layer 114 adjacent to the gimbal 76. The head gimbal assembly 120 further includes the slider 42 supported by the gimbal 76. The slider 42 is electrically connected to the ground trace 116 for electrically grounding the slider 42. Because the ground trace 116 extends at least along the load beam section 106, it is contemplated that the ground trace 108 may provide a controlled impedance path for grounding the slider 42. This is in contrast to a direct electrical short to ground such as a direct connection between the gimbal 76 and the slider 42.

According to various embodiments, the head gimbal assembly 120 may further include the load beam 66, and the trace suspension assembly backing layer 114 may be supported by the load beam 66. The trace suspension assembly backing layer 114 may be attached to the load beam 66 with a non-conductive epoxy 136 disposed between the trace suspension assembly backing layer 114 and the load beam 66 as shown in FIG. 17.

Referring to FIGS. 11–13, the head gimbal assembly 120 may further include a via 134 disposed through the dielectric layer 78, and the slider 42 may be electrically connected to the trace suspension backing layer 114 through the via 134. In this regard, a trace ground pad 126 may be disposed upon the dielectric layer 78. The trace ground pad 126 may be electrically connected to the slider ground pad 92 through a ball bond 132. The trade ground pad 126 may extend to a trace segment 128. A via opening 130 may be formed in the trace segment 128. The via 134 may be disposed through the via opening 130.

According to yet another aspect of the present invention, there is provided the disk drive 10. The disk drive 10 includes the disk drive base 16 and a head stack assembly 118 rotatably coupled to the disk drive base 16. The head stack assembly 118 is as described above.

We claim:
1. A head gimbal assembly for a disk drive, the head gimbal assembly comprising:
a trace suspension assembly backing layer formed of an electrically conductive material, the trace suspension assembly backing layer including:
a load beam section;
a gimbal coupled to the load beam section; and
a ground trace disposed adjacent the gimbal and extending along the load beam section;
a dielectric layer disposed upon the trace suspension assembly backing layer adjacent to the gimbal;

a slider supported by the gimbal, the slider being electrically connected to the ground trace for electrically grounding the slider; and read and write traces disposed upon the dielectric layer with the dielectric layer between the read and write traces and the trace suspension assembly backing layer, the read and write traces being disposed in electrical communication with the slider.

2. The head gimbal assembly of claim 1 further includes a load beam, the trace suspension assembly backing layer is supported by the load beam.

3. The head gimbal assembly of claim 1 wherein the trace suspension assembly backing layer is attached to the load beam with a non-conductive epoxy disposed between the trace suspension assembly backing layer and the load beam.

4. The head gimbal assembly of claim 1 further includes a via disposed through the dielectric layer, the slider is electrically connected to the trace suspension assembly backing layer through the via.

5. The head gimbal assembly of claim 1 wherein the read and write traces comprise copper and the ground trace comprises stainless steel.

6. A disk drive comprising:

a disk drive base; and a rotary actuator rotatably coupled to the disk drive base, the rotary actuator includes a head gimbal assembly, the head gimbal assembly comprising:

a trace suspension assembly backing layer formed of an electrically conductive material, the trace suspension assembly backing layer including:

a load beam section;

a gimbal coupled to the load beam section; and a ground trace disposed adjacent the gimbal and extending along the load beam section;

a dielectric layer disposed upon the trace suspension assembly backing layer adjacent to the gimbal;

a slider supported by the gimbal, the slider being electrically connected to the ground trace for electrically grounding the slider; and read and write traces disposed upon the dielectric layer with the dielectric layer between the read and write traces and the trace suspension assembly backing layer, the read and write traces being disposed in electrical communication with the slider.

7. The head gimbal assembly of claim 6 wherein the read and write traces comprise copper and the ground trace comprises stainless steel.

* * * * *